United States Patent
Bailey et al.

(10) Patent No.: US 8,394,464 B2
(45) Date of Patent: *Mar. 12, 2013

(54) LINING OF WELLBORE TUBING

(75) Inventors: Louise Bailey, St. Neots (GB); Benoit Vidick, Cambridge (GB); Paul Way, Hauxton (GB); John Cook, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 709 days.

This patent is subject to a terminal disclaimer.

(21) Appl. No.: 12/415,297

(22) Filed: Mar. 31, 2009

(65) Prior Publication Data

US 2010/0247794 A1    Sep. 30, 2010

(51) Int. Cl.
C08F 2/48 (2006.01)
(52) U.S. Cl. .......... 427/508; 427/230; 427/510
(58) Field of Classification Search .......... 427/510, 427/508, 230
See application file for complete search history.

(56) References Cited

U.S. PATENT DOCUMENTS

| | | | |
|---|---|---|---|
| 3,114,419 A * | 12/1963 | Perry et al. | 166/247 |
| 3,872,923 A | 3/1975 | Knight et al. | |
| 3,877,522 A | 4/1975 | Knight et al. | |
| 4,547,298 A | 10/1985 | Novak | |
| 4,744,631 A | 5/1988 | Eichenbaum et al. | |
| 4,760,882 A | 8/1988 | Novak | |
| 4,768,593 A | 9/1988 | Novak | |
| 4,933,815 A | 6/1990 | Parthasarathy | |
| 5,019,417 A * | 5/1991 | Northcutt | 427/521 |
| 5,494,106 A | 2/1996 | Gueguen et al. | |
| 5,617,496 A | 4/1997 | Kingstone | |
| 5,679,719 A | 10/1997 | Klemarczyk et al. | |
| 5,695,008 A * | 12/1997 | Bertet et al. | 166/187 |
| 5,718,288 A | 2/1998 | Bertet et al. | |
| 5,804,301 A * | 9/1998 | Curatolo | 428/352 |
| 5,995,702 A | 11/1999 | Tjonneland | |
| 6,044,906 A | 4/2000 | Saltel | |

(Continued)

FOREIGN PATENT DOCUMENTS

| | | |
|---|---|---|
| EP | 1001211 A1 | 5/2000 |
| EP | 1001290 A1 | 5/2000 |

(Continued)

OTHER PUBLICATIONS

Ciba Darocur 1173, Ciba Specialty Chemicals Inc., Coatings effects segment, Commercial product brochure: Edition Apr. 9, 2001, Basle.

(Continued)

*Primary Examiner* — Robert S Walters, Jr.

(57) ABSTRACT

A method of lining tubing within a wellbore comprises applying a polymerisable fluid composition containing a photoinitiator to the interior surface of that tubing and initiating polymerisation of the composition by exposing it to actinic radiation, suitably light or ultraviolet with wavelength 250 to 800 nm. The composition is preferably stable against heat but polymerises quickly when exposed to the actinic radiation. The composition may be spread onto the tubing and exposed to actinic radiation as soon as it has been spread into a layer, suitably with a tool which skims the tubing surface with applicator pads for dispensing and spreading the composition, immediately followed by exposing the spread composition to actinic radiation. A second option is that the composition is provided as a sleeve which is expanded against the tubing, exposure to actinic radiation preferably then being achieved using light guides or light emitting diodes within the sleeve.

21 Claims, 6 Drawing Sheets

U.S. PATENT DOCUMENTS

| | | | |
|---|---|---|---|
| 6,199,223 | B1 | 3/2001 | Sorokin |
| 6,638,063 | B2 * | 10/2003 | Otsuka .......................... 433/29 |
| 6,969,427 | B1 * | 11/2005 | Noles, Jr. ...................... 118/317 |
| 7,013,995 | B2 | 3/2006 | Crawshaw et al. |
| 7,090,370 | B2 | 8/2006 | Clark et al. |
| 7,100,684 | B2 | 9/2006 | Cook et al. |
| 7,151,123 | B2 | 12/2006 | Ramsey |
| 7,183,333 | B2 | 2/2007 | Bradley |
| 7,231,977 | B2 | 6/2007 | Keller |
| 7,334,637 | B2 | 2/2008 | Smith, Jr. |
| 7,455,106 | B2 | 11/2008 | Veneruso et al. |
| 7,516,802 | B2 | 4/2009 | Smith, Jr. |
| 7,931,091 | B2 | 4/2011 | Bailey et al. |
| 2003/0196808 | A1 | 10/2003 | Blauch et al. |
| 2004/0014833 | A1 | 1/2004 | Bradley |
| 2004/0062023 | A1 | 4/2004 | Elsegood |
| 2005/0171227 | A1 | 8/2005 | Weine |
| 2006/0185843 | A1 | 8/2006 | Smith, Jr. |
| 2007/0051510 | A1 | 3/2007 | Veneruso et al. |
| 2007/0102156 | A1 | 5/2007 | Nguyen et al. |
| 2009/0090514 | A1 * | 4/2009 | Bailey et al. ................... 166/381 |
| 2011/0162854 | A1 | 7/2011 | Bailey et al. |
| 2011/0183873 | A1 | 7/2011 | Bailey et al. |

FOREIGN PATENT DOCUMENTS

| | | | |
|---|---|---|---|
| FR | 2780751 | A1 | 7/2000 |
| GB | 2363810 | A | 1/2002 |
| GB | 2420572 | A1 | 5/2006 |
| WO | 9859151 | A1 | 12/1998 |
| WO | 0198627 | A1 | 12/2001 |
| WO | 2006050811 | A1 | 5/2006 |
| WO | WO 2006050811 | A1 * | 5/2006 |

OTHER PUBLICATIONS

Davidson: "Radiation curing," Rapra Technology Limited, United Kingdom, report 136, vol. 12, No. 4, 2001, pp. 3-30.

Fouassier: "Photointiated polymerisation—Theory and applications," Rapra Technology Limited, United Kingdom, report 100, vol. 9, No. 4, 1998, pp. 3-23.

Hsi et al: "Field evaluation of downhole corrosion mitigation methods at Prudhoe Bay Field," SPE 65014, SPE International Syposium on Oilfield Chemistry, Houston, Texas, Feb. 13-16, 2001.

Jabs et al: "New expandable cladding technique enables extended length casing repair," IADC/SPE 87212, IADC/SPE Drilling Conference, Dallas, Texas, Mar. 2-4, 2004.

LeCamp et al: "Photoinitiated polymerization of a dimethacrylate oligomer: 2. Kinetic studies," Polymer, vol. 40, 1999, pp. 1403-1409.

Leighton et al: "Water shutoff using an inflatable composite sleeve polymerized in-situ: A case history on Forties Delta," SPE 72051, SPE Production & Facilities, 2001, pp. 97-105.

Mittal: "Adhesion measurement of thin films," Electrocomponent Science and Technology, vol. 3, 1976, pp. 21-42.

Morrison: "Down hole corrosion: Problems and possible solutions," SPE 30984, SPE Eastern Regional Meeting, Morgantown, West Virginia, Sep. 17-21, 1995, pp. 89-95.

Saltel et al: "In-situ polymerization of an inflatable composite sleeve to reline damaged tubing and shut off perforations," SPE 56867, SPE Drill & Completion, vol. 14, No. 2, 1999, pp. 115-122.

Storaune et al: "Versatile expandables technology for casing repair," SPE/IADC 92330, SPE/IADC Drilling Conference, Amsterdam, The Netherlands, Feb. 23-25, 2005.

Stylar et al: "A unique rigless casing leak repair, Ghawar Field, Saudi Arabia," SPE 68129, SPE Middle East Oil Show, Bahrain, Mar. 17-20, 2001.

Van De Velden et al: "Solid expandables repair prolific subsea gas producer," SPE 108757, Offshore Europe 2007, Aberdeen, Scotland, United Kingdom, Sep. 4-7, 2007.

International Search Report and Written Opinion of PCT Application No. PCT/IB2010/000346 dated Feb. 9, 2009.

International Search Report and Written Opinion of PCT Application No. PCT/GB2008/003334 dated Oct. 13, 2010.

* cited by examiner

LINING OF WELLBORE TUBING

FIELD OF THE INVENTION

This invention relates to lining of tubing placed within a well bore. The process of lining the tubing may be carried out for various purposes, including repair, to protect the tubing against corrosion or damage, and to close off perforations which are no longer required.

BACKGROUND OF THE INVENTION

It is common practice that a wellbore leading to a subterranean reservoir, especially a hydrocarbon reservoir, is lined with a casing which is cemented in place in the wellbore. Often a production tube is positioned inside the casing. From time to time it may become necessary to replace or repair these tubular components. This may be done because of corrosion of the tubing, with the risk of failure, or because of damage to the tubing or the discovery of leakage. By way of some illustrations, Society of Petroleum Engineers papers SPE 30984, 65014 and 92330 report instances of corrosion. SPE 92330 also mentions a need to repair damage arising through perforating gun misfire. SPE108757 recounts the repair of production casing suffering leakage.

Removal of tubing to repair or replace it is very expensive. Some techniques for repair in situ exist. The known techniques for repair include systems in which an expandable sleeve is inserted within the defective tubing and then expanded into contact with the inner surface of that tubing. Expandable systems were used for the repairs reported in SPE 87212 and SPE 1087574. U.S. Pat. Nos. 5,494,106, 5,695, 008, 5,718,288 and 6044906 disclosed a system in which an expandable sleeve incorporating a fluid chemical composition is lowered to the required depth in the well by a wireline, expanded into contact with the tubing and then heated electrically to polymerise the composition to a solid state, so that the tubing is provided with a rigid ling of the polymerised composition reinforced by the fibrous supporting sleeve. The use of this system for a casing repair job was described in detail in SPE 68129. Its use to seal off perforations was described in SPE 56867 and its use to shut off water production was described in SPE 72051. This last document mentions that a specially developed polymerisable resin was required; it also mentions that the supply of electrical power to bring about polymerization was continued for some hours and required the wireline cable to be operated above its normal rating. WO98/59151 also disclosed an expandable sleeve impregnated with a polymerizable composition, and mentioned briefly that an alternative composition could be polymerizable by exposure to X-ray or uv radiation.

French published patent application FR 2780751A disclosed an alternative of impregnating the sleeve with polymerisable resin after it had been expanded within the wellbore.

Other processes using a polymerisable liquid composition have been disclosed in U.S. Pat. No. 6,969,427. This document described an earlier process in which a liquid coating was applied in an interval of tubing between two wiper plugs and polymerised to a rigid coating. The document noted difficulties with such a process and then went on to disclose its own invention in which separate components of a multipart curable system are delivered separately to a spray head which mixes them and applies them to the interior of tubing to be coated. Such a process dictates that the tubing concerned is empty while spraying is carried out and it is apparent from the text of the documnent that it envisages spraying through air or gas, not through liquid. Moreover, the provision of a plurality of paths for separate transport of the constituents of the composition will add to the cost of the equipment used if the transport pathways are long.

SUMMARY OF THE INVENTION

In contrast with prior proposals, the present invention relies on actinic radiation to initiate polymerisation of a fluid composition. According to the present invention a process of lining tubing within a wellbore comprises applying a polymerisable fluid composition containing a photoinitiator to the interior surface of that tubing and initiating polymerisation of the composition by exposing it to actinic radiation.

The actinic radiation is electromagnetic radiation, preferably ultraviolet, visible or infrared light in the wavelength range from 250 to 800 nm. This range extends slightly beyond the visible range which is generally taken to be from about 380 nm to about 750 nm.

The chemical composition will contain one or more materials capable of undergoing polymerisation, together with a photoinitiator such that exposure of the composition to actinic radiation causes the photo initiator to liberate reactive species which react with the polymerisable material and cause polymerisation to begin. Depending on the nature of the polymerisable material which is employed, the mechanical properties of the polymer lining formed on the interior of the tubing may range from hard and rigid to flexible.

The wellbore may be an existing wellbore which is in need of remedial work or it may be a new wellbore. Either way, it is envisaged that the purpose of the wellbore will be to penetrate a subterranean reservoir, notably a hydrocarbon reservoir, for production from the reservoir, injection of fluid into the reservoir or observation of conditions within the reservoir (although in the case of a new wellbore, it is possible that some lining of tubing by the method of this invention may take place before the wellbore has been drilled to its full depth and penetrated the reservoir). Such well bores are drilled through porous geological formations which contain water, brine or hydrocarbon under pressure and so in order to balance the hydrostatic pressure within the formations, the wellbore is always filled with fluid of one kind or another. Thus the interior of wellbore tubing presents a challenging environment both for the application of a polymerisable fluid composition and also for exposure of the composition to actinic radiation once the composition has been put in place.

However, we have found that it is nevertheless possible to place a polymerisable composition against the interior of tubing and expose that composition to actinic radiation, resulting in a coating which is securely attached to the tubing.

In preferred forms of this invention, external energy supplied to the downhole location is used to initiate the reaction, but not to sustain it. Less energy is required than for a polymerisation brought about by electrical heating. The chemistry of the polymerisation reaction is chosen such that once it has begun, the polymerization reaction propagates at the temperature of the downhole location where it takes place. This may be a higher temperature than the ambient temperature prevailing on the surface. Preferably the polymerisation reaction is exothermic and accelerates as it proceeds (so-called auto-acceleration) until the rate of reaction is restrained by consumption of polymerisable material and decreasing mobility of the polymer molecules within the composition as their chain length grows.

We have found that the rate of reaction can be increased by increasing the intensity and hence the amount of actinic radiation, without detriment to the end result. We have found that it is possible to choose the reactants in the composition and the intensity and duration of the actinic radiation such that, within 30 seconds or less from the time when the composition is exposed to actinic radiation, polymerization can proceed to a point where the composition is no longer mobile.

The composition should be such that polymerisation is not initiated prematurely by exposure to wellbore temperatures before exposure to actinic radiation. Hence, the beginning of polymerisation will not be greatly dependent on wellbore temperature, although wellbore temperature will have an effect on the rate of polymerisation after it has begun. Problems of matching the rate of polymerisation to the wellbore temperature can be avoided or mitigated.

Preferred stability of the composition against premature polymerization may be such that polymerization is not initiated for at least two hours by exposure to temperatures up to 150° C., better at least 200° C., in the absence of the actinic radiation.

The photo initiator is a compound that it is capable of generating a reactive species effective to initiate polymerisation upon absorption of actinic radiation preferably in the range from 250 to 800 nm. The initiating species which is generated may be a cation or a free radical. A photo initiator may therefore be referred to as a cation photo initiator or a radical photo initiator respectively.

A radical photo initiator may be a type I (cleavage type) or a type II (H-abstraction and electron donor) initiator. A type I initiator undergoes a unimolecular bond cleavage (α-cleavage) upon irradiation to yield the free radical. A type II initiator undergoes a bimolecular reaction where the triplet excited state of the photoinitiator interacts with a second molecule, which may be another initiator molecule, to generate a free radical. Typically, the second molecule is a hydrogen donor. Where the second molecule is not another initiator molecule, it may be referred to as coinitiator. The coinitiator may be an amine, alcohol or ether. Preferably, the coinitiator is an amine, most preferably a tertiary amine. Where the second molecule is another initiator molecule, the initiator may contain amine, alcohol or ether functionality.

Type I cleavable photo-initators include benzoin ethers, dialkoxy acetophenones, phosphine oxide derivatives, amino ketones, e.g. 2-dimethyl, 2-hydroxyacetophenone, and bis(2, 4,6-trimethyl benzoyl) phenyl phosphine oxide.

Type II initiator systems (photoinitiator and synergist) include aromatic ketones e.g. camphorquinone, thioxanthone, anthraquinone, 1-phenyl 1,2 propanedione, combined with H donors such as alcohols, or electron donors such as amines.

A cation photo-initiator is preferably a photoacid generator, typically a diazonium or onium salt, e.g. diaryliodonium or triarylsulphonium hexafluorophosphate.

Photo initiator will generally be a small percentage of the polymerisable composition. The percentage of photo initiator in the composition is likely to be a least 0.5% by weight and may extend up to 3% or even 5% by weight of the liquid components of the composition.

The polymerisable composition will generally comprise one or more polymerisable monomers which contain two groups able to participate in the polymerization reaction. Such monomers can extend a growing polymer chain and are likely to provide at least 50% probably at least 80% or 85% of the liquid components of the polymerizable composition. These monomers may be accompanied by a minor proportion of monomers with more than two groups able to participate in the polymerization reaction. Such monomers create branching of polymer chains or cross-linking between polymer chains and may be present as up to 15%, preferably 1 to 10% by weight of the liquid components of the polymerisable composition.

The groups able to participate in the polymerization reaction may be olefinically unsaturated groups. Polymerizable monomers may be esters of an olefinically unsaturated acid and a dihydroxy compound (although such esters may be manufactured using other starting materials such as an acid chloride, of course) The acid moiety is preferably an olefinically unsaturated acid containing 2 to 5 carbon atoms notably acrylic or methacrylic acid.

Some examples of such monomer compounds are:
bisphenol A ethoxylate diacrylates, having the general formula bisphenol A ethoxylate dimethacrylates, having the general formula and poly(ethylene glycol) diacrylates having general formula:

In the above three general formulae, m and n are average values and may vary. Generally they will lie in a range up to 15, such as 1 or 1.5 up to 15 but preferably not above 6. We have found that monomers containing ethylene oxide residues improve flexibility of the polymer but reduce its strength.

The composition preferably also includes some monomer with more than two olefinically unsaturated groups, to create branched or cross-linked polymer chains. Such compounds may be acrylate or methacrylate esters of poly hydroxy compounds.

Some examples are as follows:

| Name | Formula | MW (g/mol) |
|---|---|---|
| trimethylolpropane triacrylate | | 296 |
| trimethylolpropane ethoxylate triacrylate | The average value of n in the above formula may be chosen so that the mean molecular weight is about 430, about 600 or about 900 | |
| pentaerythritol tetraacrylate | | 352 |
| di(trimethylolpropane) tetraacrylate | | 466 |

Monomer compounds with two olefinically unsaturated groups may also be vinyl ethers such as 1,6-hexane diol divinyl ether, poly(ethylene glycol)divinyl ether, bis-(4-vinyl oxy butyl)hexamethylenediurethane, and vinyl ether terminated esters such as bis-(4-vinyl oxy butyl)adipate and bis-(4-vinyl oxy butyl) isophthalate.

Another possibility is that the groups able to participate in the polymerization reaction are epoxide groups. A suitable category of monomer compounds containing epoxide groups are glycidyl ethers of dihydroxy compounds, some specific possibilities being 1,6-hexanediol diglycidyl ether, bisphenol A diglycidyl ether and poly(ethylene glycol)diglycidyl ether.

The polymerisable composition may comprise a mixture of monomers. Notably a mixture of monomers may be used in order to obtain a desired combination of mechanical properties of the polymer lining on the tubing. The monomers will generally provide at least 50 wt % of the composition and preferably from 70 to 99.5 wt % of it.

In addition to the monomers and photoinitiator the polymerisable liquid composition may include various other materials. One possibility is a leveling agent or a wetting agent to aid adhesion to the tubing surface. Such an agent may be a surfactant to displace any film of wellbore fluid on the surface of the tubing which is about to have the polymerisable composition applied to it. Such a surfactant may be monomeric or polymeric and may include a reactive moiety such as an acrylate group to enable it to copolymerize with the main monomers of the composition. More specifically it may be a silicone polymer with pendant acrylate groups. Examples are available as TEGO RAD from Evonic Tego Chemie, Essen, Germany and EFKA 3883 from Ciba Inc. The amount (if any) of such additives are likely to be no more than 5 wt % of the composition.

The polymerisable composition may be somewhat viscous. This can assist in applying it to the tubing whilst the tubing is filled with liquid within the wellbore. Examples of rheology modifiers which may be added to the composition to enhance viscosity are fumed silica, clays and high molecular weight organic polymers. The amount (if any) of a material added solely to enhance viscosity is likely to be no more than 5 wt % of the composition.

The polymerisable composition may include one or more solids serving to reinforce it after polymerisation and/or to increase its density to match that of wellbore fluids and so assist in placing the liquid composition as a polymerisable coating on the tubing and/or as a filler to add bulk. A solid material included to reinforce the composition may be particulate, such as bentonite clay particles, or may be short fibres such as chopped glass fibres. These materials may have an additional effect of enhancingviscosity. The polymerisable composition may contain from 0 to 20 wt % of such solids, possibly even up to 30 wt % or above.

As already mentioned, the actinic radiation is electromagnetic radiation, preferably in the wavelength range from 250 to 800 nm. This range extends slightly beyond the visible range which is generally taken to be from about 380 nm to about 750 nm. The source of actinic radiation may be one or more lamps with output over a suitable range of wavelengths, such as a lamp emitting visible light, a lamp emitting ultraviolet radiation, such as a uv-a lamp emitting in the wavelength range 320-400 nm (sometimes termed near uv) or a uv-b lamp emitting in the 280-320 nm range. The radiation source may be one or more light emitting diodes emitting ultra violet or visible light.

In order to emit light in proximity to the polymerisable composition applied to the tubing, it may be convenient to convey the light along one or more light guides. The terms "light guide" and "optical fibre" have at times been used almost interchangeably. An optical fibre has an elongate core filament of glass or of organic polymer surrounded by one or more layers of cladding, with the core having a higher refractive index than the cladding, so that light introduced at one end of the fiber will be internally reflected for transmission longitudinally within the core to the other end of the fiber. A "fibre optic cable" comprises a sheath surrounding a multiplicity of optical fibres.

The term light guide is used herein to denote an elongate conduit for the light, enabling light to travel along the conduit from one end towards the other. A light guide may be a fibre optic cable comprising a bundle of optical fibres within common outer sheath. It may also be formed from a liquid core within an enclosing tube where the refractive index of the liquid core exceeds that of the tube. Use of a liquid core or use of a bundle of separate fibres allows such light guides to be flexible.

Light guides may be intended to convey light from one end to the other with as little loss is possible. However, it is also known to construct light guides so that some of the light entering at one end of the light guide is emitted laterally with the result that lateral light output is distributed along the length of the light guide. Light guides of this type have for instance found application in various kinds of decorative and display lighting. There are a number of methods for causing light to be emitted laterally along the length of a light guide as for example disclosed in U.S. Pat. Nos. 4,933,815, 5,617,496 and 5,995,702.

As will be explained further below, apparatus for carrying out the method of the present invention may make use of light guides for conveying light from one end to the other and/or may make use of light guides which distribute light emission along their length. Both types of light guide are available from various manufacturers including Universal Fibre Optics Ltd, Coldstream, Scotland.

Application of the polymerisable liquid coating to the interior of the wellbore tubing may be carried out in several ways. The composition may be applied as a fluid layer coated onto the inside surface of the tubing and then exposed to actinic radiation to initiate polymerisation.

A tool for applying the composition may be configured to dispense the composition onto the tubing interior and to spread to dispensed composition into a continuous layer. Such a tool may include an applicator element which is made to skim over the surface of the tubing. Preferably the same tool directs actinic radiation onto the composition after it has been spread into a continuous layer. For this purpose the tool may include one or more electrically powered sources of actinic radiation, preferably of a wavelength in the range from 250 to 800 nm. The tool may include one or more light guides to carry the radiation from its source to a point from which it is directed onto the polymerisable material. The actinic radiation may be directed at the layer of polymerisable material from one or more positions which are proximate to the layer but not in direct contact with it. More specifically, the radiation may be emitted from an applicator element configured to dispense the composition from one or more outlets and direct actinic radiation from one or more positions which follow the dispensing outlets as the applicator element skims over the interior surface of the tubing. The applicator element may be made to follow a helical path in order to apply a lining to a length of tubing.

Such a tool may further comprise a reservoir for holding a quantity of the polymerisable composition and a metering pump or control valve for controllably dispensing the composition from the reservoir onto the interior of the tubing.

In a variation on this approach, a flexible and expandable porous sleeve is introduced into the wellbore and expanded against the tubing. The fluid composition is dispensed onto the tubing through the sleeve after which actinic radiation is directed on to the polymerisable material. The porous sleeve becomes embedded within and reinforces the polymer lining on the tubing. An alternative approach uses a porous sleeve containing the polymerisable composition. The sleeve is introduced into the wellbore and expanded against the tubing at the desired position within wellbore so that the polymerisable composition is pressed into contact with the interior of the tubing. After the composition has been put in place in this way it is exposed to actinic radiation. This may be done with light guides extending within the composition or light emitting diodes distributed within it. When polymerisation takes place material of the porous sleeve will become embedded within the polymer lining as a reinforcement and light guides or diodes within the composition will be left embedded within the polymer lining.

A sleeve containing the liquid polymer may enclose it between inner and outer walls of the sleeve, with the outer wall being permeable by some of the liquid composition when the sleeve is pressed against the tubing. The sleeve may comprise a number of layers of reinforcing fabric, impregnated with the polymerisable liquid composition. A further possibility is that the sleeve has expandable metal parts on its inside wall, which become adhered to the inside surface of the polymer lining of the tubing and so providing a stronger surface for the lining.

DETAILED DESCRIPTION

Figure 1:
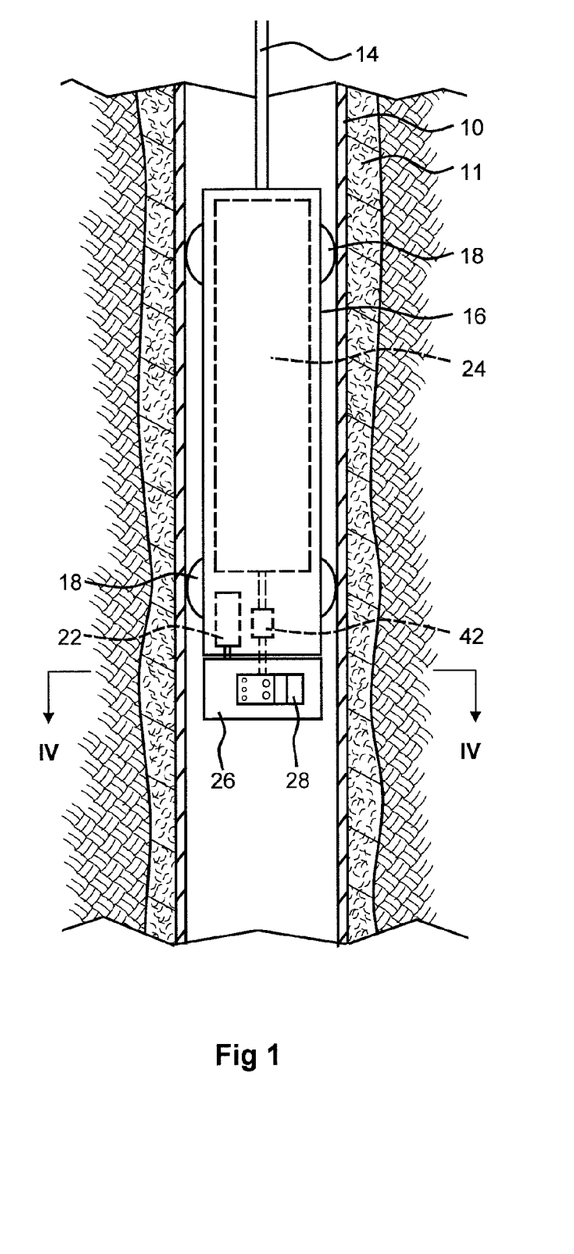
FIG. 1 is a cross sectional view of a cased wellbore with a wireline tool for applying a polymer lining to the tubing.

As shown in FIG. 1, a wellbore has been cased with steel tubing 10 with cement 11 filling the space between the tubing 10 and the surrounding geological formation.

In order to apply a polymer lining to the interior surface of the tubing 10, a tool having upper and lower parts 16, 26 is lowered into the wellbore by means of wireline 14. This wireline provides (as is normal for wireline operations) an electrical power supply from the surface to the tool and data and control communication between the tool and the surface.

The tool's upper body part 16 is centred within the tubing 10 and constrained against rotation by centering devices 18 pressed outwardly against the tubing 10. Below this upper part 16 is a lower body part 26 which can rotate around the longitudinal axis of the tool. The upper part 16 of the tool accommodates a reservoir 24 of polymerisable liquid composition and a drive motor 22 to rotate the lower part 26 of the tool.

Figure 4:
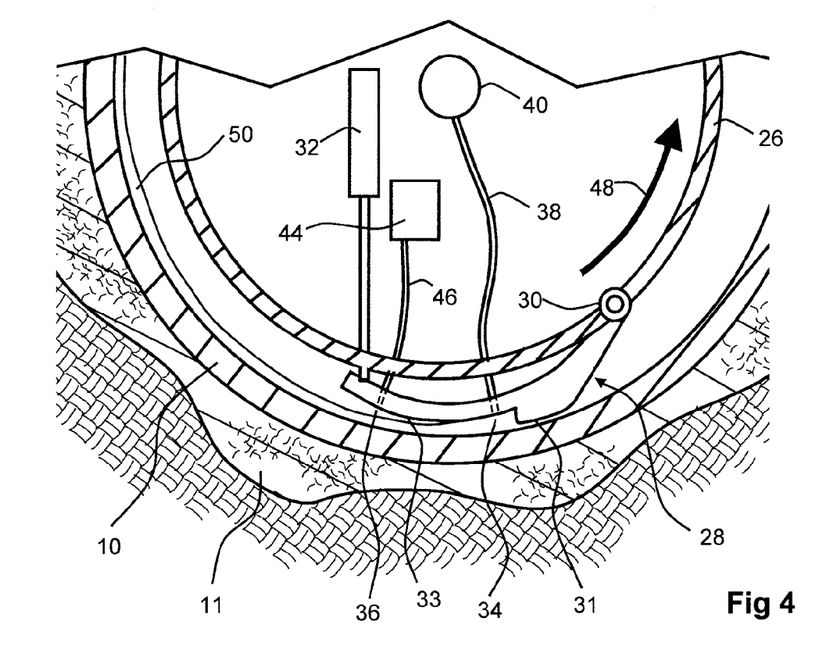
FIG. 4 is a partial cross section on the line IV-IV of FIG. 1.

The lower part 26 of the tool is fitted with two applicator pads 28 at diametrically opposite positions, Each pad is pivotally mounted at 30 to the main body of the lower part 26 of the tool, so that it can be moved between a retracted position (not shown) in which the pad does not project beyond the periphery of the lower body part 26 and an extended position, shown in FIG. 4, in which the pad is swung outwardly so that its face 31 slides over the inner surface of the tubing 10. Each pad is extended and retracted by a drive mechanism 32

Figure 2:
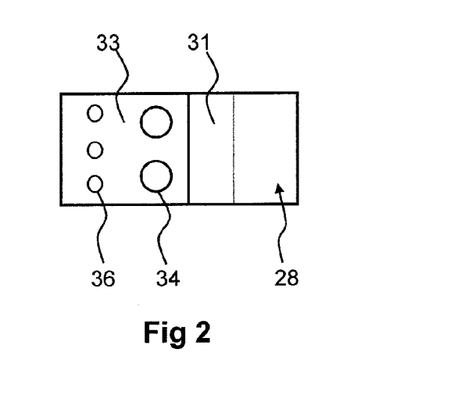
FIG. 2 is a larger scale view onto the applicator pad seen in FIG. 1.

Trailing behind the face 31 of each pad 28 is a portion whose outer face 33 lies close to the surface of tubing 10, but does not touch it. This part of the pad has a pair of holes 34 one above the other for the delivery of liquid polymerisable composition onto the tubing 10. These holes 34 are connected by flexible pipes 38 to a manifold 40 at the centre of the body 24. This manifold is connected, through a rotatable coupling, to a metering pump 42 controlling delivery of composition from reservoir 24.

Each pad 28 also has three outlets 36 through which actinic radiation is directed towards the interior face of the tubing. The radiation comes from a source 44 emitting either visible light or ultraviolet radiation with a wavelength of at least 250 nm. Light or ultraviolet from the source is carried to each outlet 36 by means of a light guide 46, consisting of a bundle of optical fibres, for conveying the light or ultraviolet from the source 44 to the outlet 36.

In order to apply a lining to the interior of a length of tubing 10, the tool 12, with the pads 28 retracted, is lowered into the wellbore by means of the wireline 14 until the relevant section of tubing is reached. The pads 28 are then swung outwardly by their respective drive mechanisms 32 and the lower part 26 of the tool is rotated in the direction indicated by the arrow 48. The metering pump 42 is operated to dispense the liquid composition through the pipes 38 and holes 34 into the narrow gap between the face 33 of the pad and the tubing 10. The face 33 of the pad serves as a spreader to spread the composition into a continuous layer 50 on the interior of the tubing 10. The composition which has been applied is then exposed to light or ultra-violet radiation emitted through the outlets 36, thereby initiating polymerization of the composition which has just been spread onto the wall of the tubing 10. While the lower part 26 of the tool is rotated and the liquid composition is being delivered from the reservoir 24, the wireline 14 is slowly pulled upwardly, so that the liquid composition is applied to the interior of the tubing 10 in a helical pattern, more specifically a double helix because there are two pads 28.

It will be appreciated that, relative to the direction of rotation indicated by arrow 48, holes 34 through which the composition emerges are just upstream of the point where the distance between the face 33 of the pad and the tubing 10 is smallest. This assists in spreading the liquid composition into a continuous layer. The outlets 36 for the actinic radiation are slightly downstream of this narrowest point so that the outlets are close to the surface of the layer of composition which has just been applied, but do not touch it.

Figure 3:
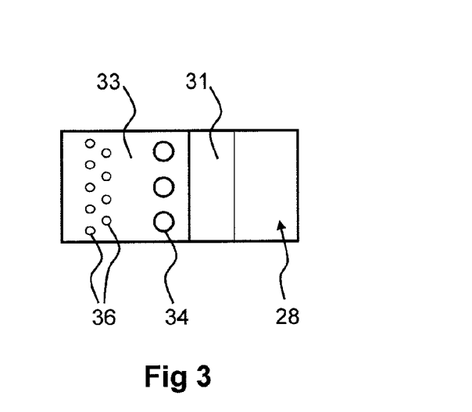
FIG. 3 is a similar view onto a slightly different pad.

FIG. 3 shows a modified form of pad 28 with three holes 34 and an array of radiation outlets 36 in a staggered pattern so as more effectively to expose the entire width of the layer of applied composition to actinic radiation.

Figure 5:
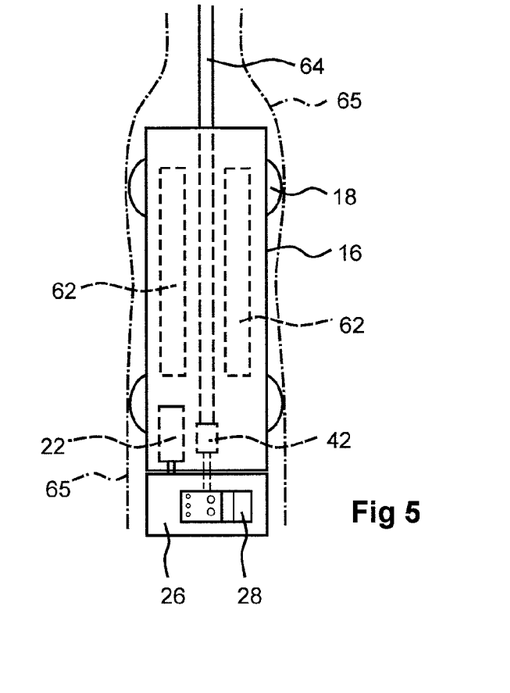
FIG. 5 is a cross sectional view of an equivalent tool fitted to coiled tubing.

FIG. 5 illustrates an equivalent tool mounted on coiled tubing 64. The coiled tubing is continued through the upper body part 16 of the tool to the metering pump 42 and delivers the polymerisable composition to the metering pump 42. The drive motor 22 which rotates the lower part 26 of the tool is powered by battery packs 62 within the upper part 16 of the tool. Alternatively, the coiled tubing could include an integral power cable, so that the battery packs would not be required.

FIG. 5 also illustrates the possibility that an expandable reinforcing mesh sleeve 65 is placed over the tool and the coiled tubing 64 above it before this is inserted into the wellbore. When the tool is at the required place within the tubing 10, it is operated as already described. The applicator pads 28 apply the coating of polymerisable composition to the inside of the tubing 10 through the sleeve 65, expanding the sleeve against the tubing and embedding it within the polymer lining as that lining is formed on the tubing.

FIGS. 6 to 10 show a different embodiment of this invention. This embodiment uses some features described in U.S. Pat. Nos. 6,044,906 and 5,695,008 but polymerisation is brought about by photo initiation in accordance with this invention.

Figure 6:
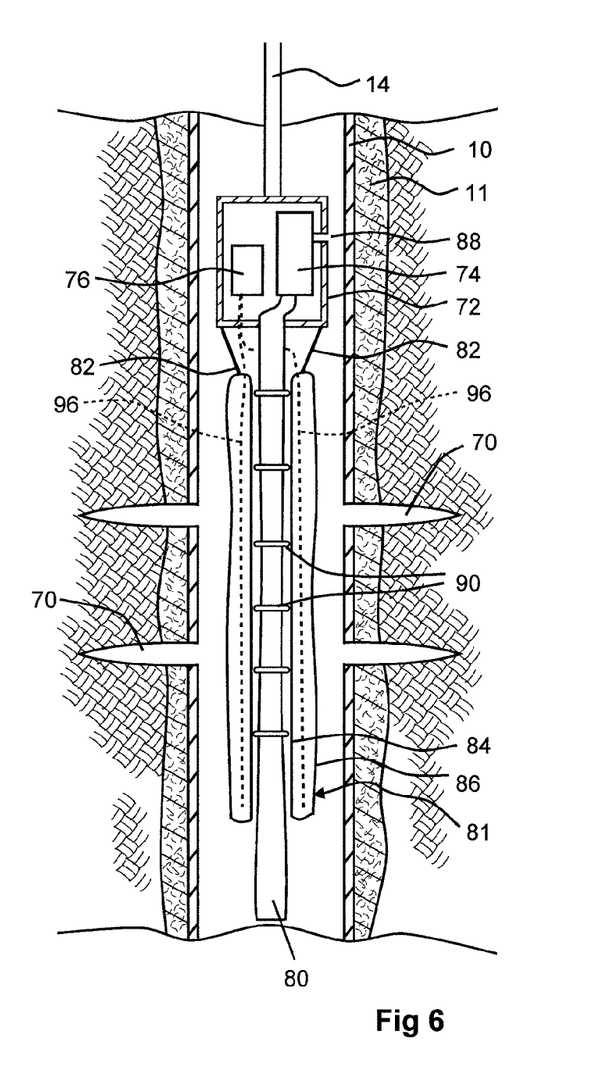
FIG. 6 is a cross sectional view of a cased wellbore with a different form of wireline tool for applying a polymer lining to the tubing.
Figure 7:
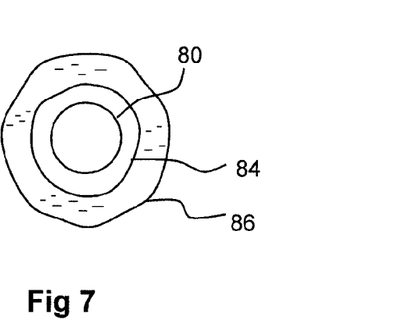
FIG. 7 is a partial cross section on the line VII-VII of FIG. 6

As shown, a wellbore has been cased with steel tubing 10 with cement 11 filling the space between the tubing 10 and the surrounding geological formation. In this illustration it is assumed that the wellbore has perforations 70 which are no longer required. It is desired to seal over them with a polymer lining to the tubing 10. However, the system described here as could be used for other purposes, including sealing over a leak in the tubing, or to strengthen corroded tubing before it begins to leak.

The first stage, as shown in FIG. 6, is that wireline 14 is used to lower a tool assembly into the wellbore and position the assembly at the point where a polymer lining is to be applied. At the top of this assembly, a drive unit 72 is connected to the wireline 14. It has a body (shown in section) inside which there is a reversible pump 74 and a source 76 of actinic radiation. An inflatable vessel 80 is attached to unit 72 and is connected inside that unit to the pump 74 which can be operated to draw wellbore fluid in through port 88 and pump that fluid into the vessel 80, thereby inflating it. The pump 74 can also run in reverse to pump fluid out of the inflatable vessel and back into the wellbore, so as to deflate the vessel 80.

Surrounding this vessel 80 is a hollow sleeve 81 containing a quantity of polymerisable liquid composition. This hollow sleeve is attached to drive unit 72 by cords 82. The sleeve has an inner wall 84 and an outer wall 86 joined at each end of the sleeve, with the space between these walls filled with viscous liquid polymerisable composition.

Both the inner wall 84 and the outer wall 86 are formed of woven fabric which can expand radially whilst contracting axially, as described in U.S. Pat. No. 5,695,008. The weave of this fabric is sufficiently close that the walls can retain the polymerisable composition within the sleeve, although some of the composition can pass through the woven fabric when placed under pressure.

Figure 8:
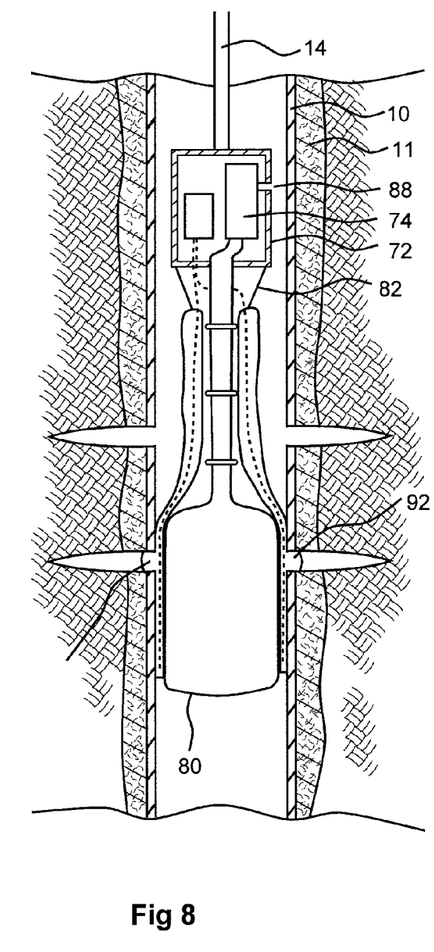
FIGS. 8 and 9 are similar cross sections to FIG. 6, showing later stages of applying the lining.
Figure 9:
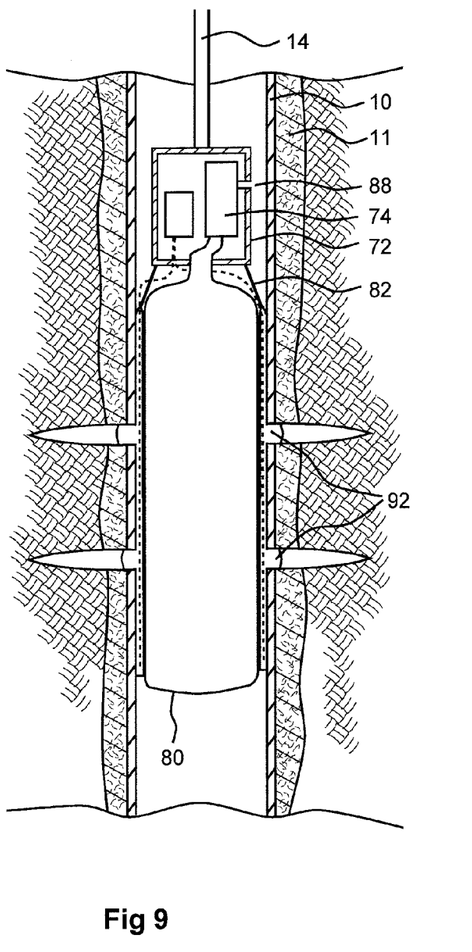

Once the assembly has been placed at the correct position in the tubing 10, the pump 74 is operated to inflate the vessel 80 with fluid from wellbore, drawn in through port 88. As taught by U.S. Pat. No. 6,044,906 the vessel 88 is encircled by a number of breakable bands 90. In consequence it expands first at the bottom, anchoring the assembly within the tubing 10 and then progressively expands upwardly along its length, breaking the bands 90 in sequence. FIG. 8 shows a partially inflated condition and FIG. 9 shows the assembly when the vessel 80 has been fully inflated. Constraining inflation to progress from one end of the assembly towards the other avoids the possibility of trapping pockets of wellbore fluid between the outer wall 86 and the tubing 10.

As the vessel 80 inflates, the sleeve containing the polymerisable composition is pressed against the tubing 10 and some of the polymerisable composition is forced through the outer wall 86 into direct contact with the tubing. Where there is a perforation 70 through the tubing 10, some of the polymerisable composition is forced into the perforation, as indicated at 92.

Figure 10:
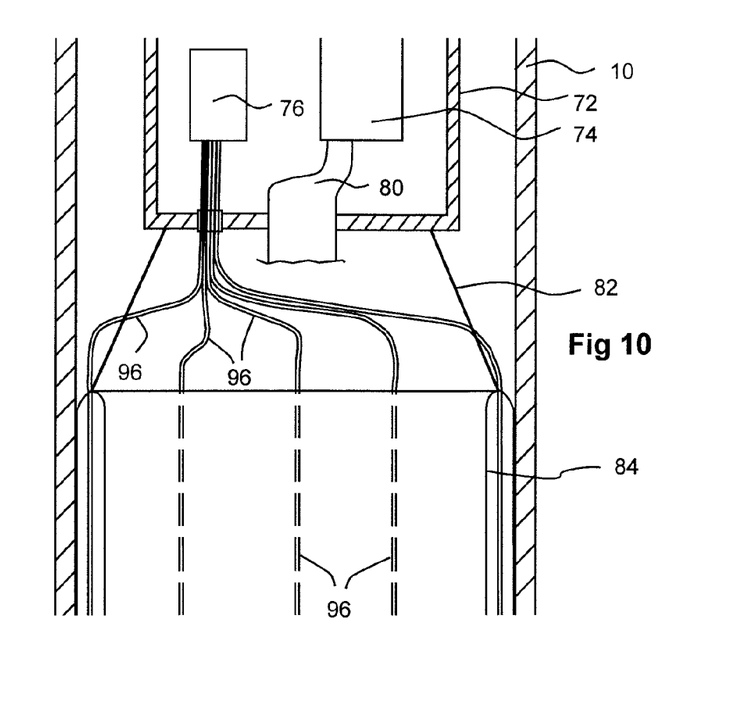
FIG. 10 is an enlarged cross section showing the lighting system.

After the vessel 80 has been fully inflated so that the entire sleeve has been pressed against the tubing 10, polymerisation is initiated with a light transmitting system shown by a FIG. 10.

Inside the unit 72, there is a light source 76 connected to a bundle of light guides 96 which extend from the light source into the interior of the sleeve 81. These light guides enter the sleeve at positions distributed around its top and extend down into it. Each of these light guides is of the type which emits light laterally from its whole length. Consequently, when the light source is turned on, light is emitted throughout the polymerisable material.

When this polymerisation takes place, the liquid composition which has been placed against the interior of the tubing 10 by expansion of the vessel 80 and sleeve 81 becomes a polymer lining of the tubing 10. The outer wall 86 of the sleeve, and possibly also the inner wall 84, becomes embedded within this polymer lining as do the light guides 96.

The light source is kept on for a period of time so that light reaches all parts of the polymerisable composition. After sufficient time for polymerisation to be completed, the pump 74 is operated in reverse to expel wellbore fluid from the vessel 80 back into the wellbore through the port 88, and thus deflate the vessel 80. The wireline 14 is then pulled upwards to retrieve the drive unit 72 and the vessel 80. This breaks the cords 82 and also breaks one by one the portions of the light guides between the unit 72 and the polymer lining on the tubing.

Figure 11:
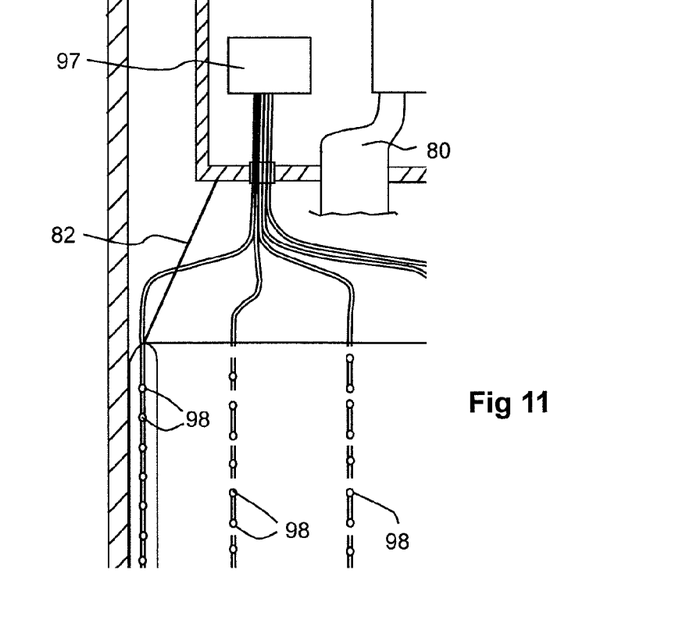
FIG. 11 is a similar enlarged cross section, showing a different lighting system.

FIG. 11 shows an alternative lighting system. In place of the light source and light guides there is a power supply 97 connected to pairs of wires with light emitting diodes (LEDs) 98 connected between the wires at spaced intervals. As before, after the vessel 80 has been fully inflated electric current is supplied to these LEDs 98 so that they emit light at a multiplicity of positions within the polymerisable composition. The LEDs themselves become embedded within the composition as it becomes a polymer lining on the inside of the tubing 10 and are thus used one time only.

Variations to the lighting system are possible. For example, light guides 96 or wires with LEDs 98 between them might not extend straight up and down within the sleeve 81 but could have some other configuration, for example wound as a helical coil within the sleeve. Rather than locating a main light source within the drive unit 72, one or more light sources could be located at the top of the sleeve 81 and configured to direct light into light guides 96 extending from there. Although a light source has been mentioned here, it could of course be a source of ultraviolet with wavelength above 250 nm.

Other materials could be used to fabricate the walls of the sleeve. The inner wall might be formed from an elastomeric sheet, impervious to the polymerisable liquid. The outer wall might be woven so as to be expandable radially without axial contraction, for example woven from glass fibres in the warp of the weave with elastomeric fibres in the weft. Alternatively the outer wall 86 might be formed from an elastomeric sheet material but with a multiplicity of small perforations through which some of the polymerisable composition can be extruded when the sleeve is pressed against the tubing by the vessel 80.

One or both walls might be formed from two layers of material, one layer being expandable and permeable to the polymerisable liquid while the other layer is impermeable to the polymerisable liquid but weaker and not expandable. Then when sleeve 81 is expanded by inflation of the vessel 80, the weaker impervious layer bursts. For convenience in handling the entire sleeve might be enclosed within a bag of thin, inextensible material which bursts when the sleeve is expanded.

Figure 12:
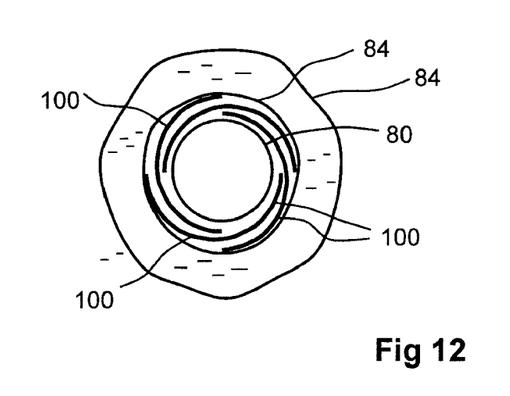
FIG. 12 is a cross section analogous to FIG. 7, showing a modification.

FIG. 12 illustrates a further modification which provides a metal surface to the lining in order to protect it against abrasion or damage by tools employed in the well for other purposes at some later time. The inner and outer walls 84, 86 are formed of material which is radially expandable. In addition, a plurality of overlapping metal sheets 100 (four are shown but more could be used) are attached to the inside of the inner wall. When the vessel 80 is inflated to inflate the sleeve 81, these sheets slide over each other and then become pressed against the inside wall 84 of the sleeve. The pressure exerted on the sleeve when it is expanded causes some of the polymerisable liquid to be extruded through the inner wall 84 of the sleeve into contact with these metal sheets 100 which thus become adhered to the inside face of the polymer lining. A metal inner surface might also be achieved with some other geometry which is radially expandable, such as a helical metal coil with overlapping turns, or with corrugated metal as the material of the inner wall 84 of the sleeve. As the sleeve is expanded, the corrugations open out.

EXAMPLE 1

Some laboratory experiments were carried out to demonstrate features of embodiments of the present invention.

Samples of polymerisable liquid composition were placed in an I-shaped plastic mould and polymerization was initiated by exposure to the radiation from a 6 W UV lamp (manufactured by UV products, and purchased from Fisher Scientic UK). The lamp was dual wavelength, emitting at wavelengths of 254 nm or 365 nm.

Curing kinetics were followed using a Nicolet FTIR (Fourier Transform Infra-Red) spectrometer with a ZnSe ATR (attenuated total reflection) plate. The UV lamp was placed in the access port on the spectrometer, and the plate was irradiated during spectral acquisition. Changes in the height of the 1634 cm peaks was followed, this being the C=C stretch of the acrylate group. As the, polymerization reaction proceeded the C=C bonds were eliminated and the peak height dropped. It was observed that the polymerization reaction took place over a period of ten minutes or less.

The compositions were made from the following materials:
- 15 gm bisphenol A ethoxylate diacrylate (BAED)
- 0.5 gm trimethylolpropane triacrylate (TPT)
- 5 gm of one of the following
  i. poly(ethylene glycol) diacrylate (PEGD) molecular weight 260;
  ii. poly(ethylene glycol) diacrylate (PEGD) molecular weight 700;
  iii. poly(ethylene glycol) diacrylate (PEGD) molecular weight 575;
  iv. 1,6-hexanedioldiacrylate (HDD);
  v. poly(ethylene glycol) dimethacrylate m wt. 330 (PEGDM)
- 10 drops of 2-hydroxy-2 methyl-propiophenone (photoinitiator)

The cast resin samples, approximately 1 mm thick, were tested for tensile strength using a TXAT texture analyzer (Stable Microsystems Inc.) in extension mode. Coarse abrasive paper was glued to the face of the sample grips to prevent slippage of the smooth resins. All five of these compositions polymerized to produce hard, strong, quite brittle polymers.

Compositions were also prepared containing clay. Two clays were used:
Bentone 42, an organophilic clay from Elementis Specialities Inc.; and,
Bentopharm, a natural montmorillonite from Wilfred Smith Ltd. Using up to 20% clay in the compositions enhanced the strength of the polymer samples obtained.

EXAMPLE 2

Figure 13:
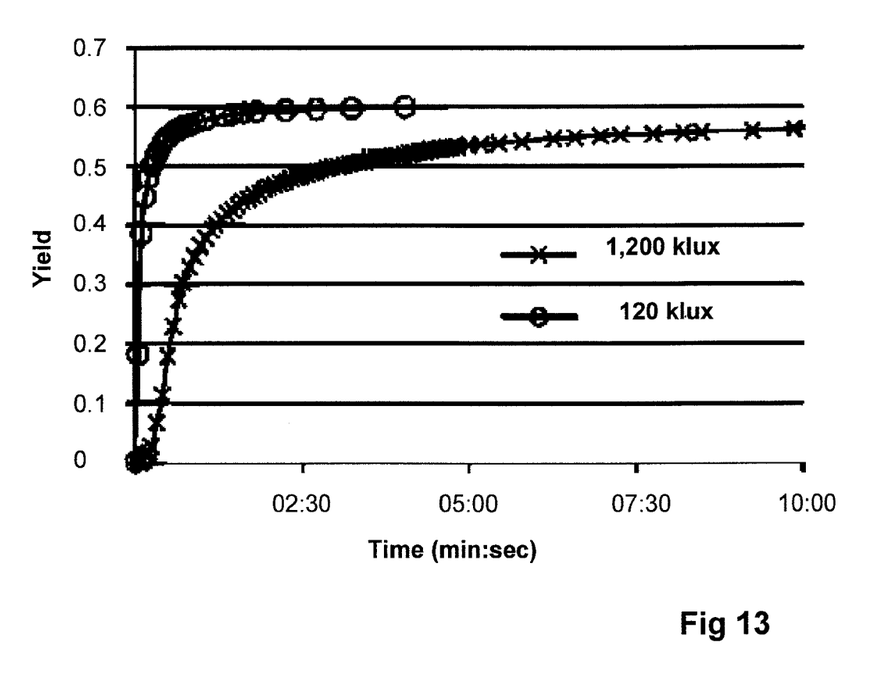
FIG. 13 shows a plot of reaction yield against time obtained in Example 2.

A laboratory experiment was carried out to examine the effect of radiation intensity on speed of reaction. Bis phenol A ethoxylate diacrylate containing 0.2% (bis (eta 5-2,4-cyclopentadien-1-yl)bis [2,6-difluoro-3-(1H-pyrrol-1-yl)phenyl] titanium as photoinitiator was irradiated with white light having a peak wavelength of 555 nm. The rate of reaction was followed using the Fourier Transform Infra-Red spectrometer mentioned in Example 1 to monitor the decrease of the vinyl (1,400 cm−1) peak area, relative to the carbonyl (1,700 cm−1) peak area. Irradiation was at either 1,200 klux or 120 klux (equivalent to 190 or 19 mW/cm−2, respectively). A plot of the extent of reaction against time is shown as FIG. 13. Not all acrylate groups react because the polymer chains cease to grow when the reaction mixture becomes solid, but it can be seen that the higher intensity of illumination leads more rapidly to a similar level of completion, with the reaction being largely complete in less than 30 seconds.

EXAMPLE 3

Laboratory apparatus for applying polymerisable composition to the interior of a cylinder was constructed to have a dispensing outlet for liquid composition, followed by an outlet for ultraviolet radiation, similarly to the arrangement shown in FIGS. 1 to 4. This apparatus was used to apply a polymerisable liquid composition as shown in the following table to the interior of a clear acrylic cylinder and direct ultraviolet radiation onto the composition as it was applied. During application of the composition there was rotation and axial movement of the apparatus relative to the cylinder (For convenience in construction the cylinder was move and the apparatus was fixed). The cylinder was then inspected and found to have a band of rigid polymer extending as a helix adhered to its interior surface.

The polymerisable liquid composition contained

| Chemical | Weight % |
| --- | --- |
| Bisphenol A (1.5) ethoxy diacrylate | 73.2 |
| Polyethyleneglycol diacrylate Mol. wt 260 | 24.4 |
| pentaerythritol tetraacrylate | 2.4 |
| 2-hydroxy-2 methyl-propiophenone (photoinitiator) | 0.2 |

EXAMPLE 4

A laboratory experiment was carried out to test adhesion of the polymer to steel. The composition used was the same as that in Example 3. The strength of the bond to steel was tested using a known test: the "pull-off" test which has been reported as a measure of coating adhesion. The procedure for that use of the test is to apply measured tensile force to a loading fixture, commonly called a dolly or stub, affixed by an adhesive to a coating. The force required to pull the dolly off, or the force the dolly withstood, is the measured tensile strength. Failure occurs along the weakest plane within the system comprised of the dolly, adhesive, coating, and substrate See Mittal K. L., Electrocomponent Sci. and Tech., 3, 21-42 (1976).

In this example, acrylic cylinders 20 mm diameter, 40 mm long were used as dollies. This material has the required light and UV transmissivity and is compatible with acrylic resins thereby maximising bonding between the dolly and the polymer. To prepare the test samples 2-3 drops of a polymerisable liquid composition were placed on the test substrate, and the dolly (cleaned in iso-propanol) was placed on top—this amount of polymerisable composition was sufficient to just spread to the diameter of dolly. The composition was is then cured, by exposing the free end of the cylinder to a high intensity 150 W UVA/Vis light source at a standoff of about 10 cm for 5-10 seconds. The cylinder acts as a light guide, conveying the uv/visible radiation along its length to the polymerisable liquid.

After polymerisation had taken place, a load frame the TXAT Texture Analyser was used in its compression mode to measure bond strength. The test substrate was mounted on its side in a clamp so that the acrylic cylinder lies horizontally and the plane of the polymer layer was vertical. A standard test probe was brought into contact with the top edge of the cylinder parallel to the plane of the resin layer. The test probe was moved downwards and load on the cylinder was increased until the bond failed.

With both mild steel and stainless steel plates as test pieces, bond strengths in the range 50-100 N were measured indicating that the dolly was strongly bonded to the steel plate. In the majority of cases the bond failed at the acrylic-resin interface in preference to the steel-resin interface.

The invention claimed is:

1. A method of lining tubing within a wellbore wherein the tubing is filled with a fluid, the method comprising
   placing a tool comprising an applicator element within the tubing;
   moving the tool through the fluid in the tubing to skim the applicator element over the surface of the tubing;
   dispensing a layer of a polymerisable fluid composition having liquid components and containing a photoinitiator from the applicator element onto the interior surface of the tubing, and initiating polymerisation of the composition by exposing it to actinic radiation having a wavelength in a range from 250 to 800 nm.

2. A method according to claim 1 wherein the polymerization reaction is self-sustaining without application of heat above the wellbore temperature after it has been initiated.

3. A method according to claim 2 wherein the polymerization reaction is exothermic.

4. A method according to claim 1 wherein the polymerisable composition is such that polymerization is not initiated for at least two hours by exposure to temperatures up to 150° C. in the absence of actinic radiation.

5. A method according to claim 1 wherein at least 80% by weight of the liquid components of the polymerisable composition are one or more monomers which have two groups able to participate in the polymerization reaction.

6. A method according to claim 1 wherein from 1 to 10% by weight of the liquid components of the polymerisable composition are one or more monomers which have more than two groups able to participate in the polymerization reaction.

7. A method according to claim 5 wherein said monomers are selected from
   i. dihydroxy compounds esterified by at least one olefinically unsaturated carboxylic acid containing 3 to 5 carbon atoms, and
   ii. glycidyl esters of dihydroxy compounds.

8. A method according to claim 1 wherein the applicator element comprises a zone which contacts the tubing, followed by at least one dispensing outlet for the polymerisable composition, spaced from the tubing surface, followed by at least one outlet for actinic radiation, spaced from the surface of the layer of composition applied to the tubing.

9. A method according to claim 1 wherein a porous reinforcing sleeve is expanded against the tubing and thereafter the fluid composition is dispensed onto the tubing through the sleeve.

10. A method of lining tubing within a wellbore wherein the tubing is filled with a fluid, the method comprising
    introducing a porous sleeve which contains a polymerisable fluid composition having liquid components and containing a photoinitiator into the interior of the tubing;
    expanding the sleeve into contact with the tubing, and
    initiating polymerisation of the composition by exposing it to actinic radiation having a wavelength in a range from 250 to 800 nm.

11. A method according to claim 10 wherein the polymerization reaction is self-sustaining without application of heat above the wellbore temperature after it has been initiated.

12. A method according to claim 11 wherein the polymerization reaction is exothermic.

13. A method according to claim 10 wherein the polymerisable composition is such that polymerization is not initiated for at least two hours by exposure to temperatures up to 150° C. in the absence of actinic radiation.

14. A method according to claim 10 wherein the polymerisable composition comprises one or more monomers which have two groups able to participate in the polymerization reaction and from 1 to 10% by weight of the liquid components of the polymerisable composition are one or more monomers which have more than two groups able to participate in the polymerization reaction.

15. A method of lining tubing within a wellbore wherein the tubing is filled with a fluid, the method comprising
    introducing within the tubing an assembly which comprises a porous sleeve which contains a polymerisable fluid composition having liquid components and containing a photoinitiator, an inflatable vessel inside the sleeve, means for inflating the vessel, and at least one source of actinic radiation having a wavelength in a range from 250 to 800 nm;
    expanding the sleeve into contact with the tubing, and
    initiating polymerisation of the composition by exposing it to actinic radiation from the at least one source having a wavelength in a range from 250 to 800 nm.

16. A method according to claim 15 wherein the assembly also comprises a plurality of light guides extending from said at least one source of actinic radiation and extending within the polymerisable composition within the sleeve.

17. A method according to claim 16 wherein said at least one source of actinic radiation comprises a plurality of light emitting diodes distributed within said polymerisable composition within said sleeve.

18. A method according to claim 15 wherein the polymerization reaction is self-sustaining without application of heat above the wellbore temperature after it has been initiated.

19. A method according to claim 18 wherein the polymerization reaction is exothermic.

20. A method according to claim 15 wherein the polymerisable composition is such that polymerization is not initiated for at least two hours by exposure to temperatures up to 150° C. in the absence of actinic radiation.

21. A method according to claim 15 wherein the polymerisable composition comprises one or more monomers which have two groups able to participate in the polymerization reaction and from 1 to 10% by weight of the liquid components of the polymerisable composition are one or more monomers which have more than two groups able to participate in the polymerization reaction.

* * * * *